United States Patent Office 3,120,567
Patented Feb. 4, 1964

3,120,567
STABILIZATION OF PERCHLOROETHYLENE
WITH A MIXTURE OF AN EPOXIDE AND
AN ALKOXYNITRILE
William R. Dial, Akron, Ohio, assignor to Pittsburgh Plate Glass Company, Pittsburgh, Pa., a corporation of Pennsylvania
No Drawing. Filed Mar. 21, 1961, Ser. No. 97,176
6 Claims. (Cl. 260—652.5)

This invention relates to the stabilization of perchloroethylene. It further relates to the improved stabilizing action of certain stabilizers by means of chemicals which result in synergism.

It is known that halogenated hydrocarbons in general have a tendency to decompose during use, storage and even manufacture. This tendency is particularly noticeable with certain chlorinated hydrocarbons and at times becomes so severe that equipment employed in the manufacture, storage and use of these hydrocarbons is damaged. In manufacture much of the damaging corrosion can be averted by proper choice of material of construction. However, many of the intended uses necessarily or economically entail contact with materials that can be corroded. Thus, the literature reports employing numerous chemicals for the purpose of reducing corrosion and/or decomposition of halogenated hydrocarbons during their use. Similar accumulation of knowledge has resulted from the application of halogenated hydrocarbons in the field of dry cleaning where decomposition of halogenated solvents causes deterioration of fabrics. During dry cleaning operations used solvent is recycled by filtration through charcoal absorbers and alternatively by redistillation to remove accumulated dirt, grease, etc. At times solvent is passed through screens made of galvanized metal and frequently galvanized piping is employed. Thus, perchloroethylene is desirably stabilized for the purpose of avoiding attack on galvanized metal.

Among the chemicals which have been recognized by the art as stabilizers for halogenated hydrocarbons are: phenolic materials such as hexylresorcinol, cresol, phenol; amino compounds such as aniline, pyridine, etc.; esters such as ethyl acetate; and various hydrocarbons.

Avoidance of attack on galvanized metal in dry cleaning equipment has been sought by incorporating suitable stabilizing substances. Many stabilizer combinations have been discovered which offer a partial solution to the problem. While chemicals are known which will impart a measure of stability to halogenated solvents, none are recognized which will stabilize against all types of solvent decomposition and their attack upon various materials. Thus, there are varied requirements for halogenated solvents which are met to a degree, but in general, halogenated hydrocarbons require reprocessing after a period of use. Therefore, the consumer requires chlorinated solvents which permit the maximum periods of use before corrosion begins and the solvent must be discarded or reclaimed.

In accordance with this invention it has been found that surprisingly effective stabilization of halogenated hydrocarbons such as perchloroethylene is achieved by utilization of alkoxyalkylnitriles and epoxides. By using these two components a degree of stabilization results which is greater than that possible with either type of substance alone. Alkoxyalkylnitriles alone have been found to possess a stabilizing value particularly useful in the prevention of copper corrosion as claimed by U.S. Patent 2,737,532. Now, however, it has been discovered that perchloroethylene containing both alkoxyalkylnitrile and epoxide is stabilized to an extent such that the corrosion of base metals by the resulting new formulation is greatly reduced, while at the same time a synergistic action is observed with respect to inhibition of copper corrosion.

The alkoxyalkylnitriles containing 1 to 3 carbon atoms in the alkoxy group and 1 to 3 carbon atoms in the alkyl group such as β-ethoxypropionitrile are added to perchloroethylene along with an epoxide such as cyclohexene oxide. Such stabilized compositions have acceptable odor, color, characteristics and inhibit the corrosion of galvanized metal to a degree significantly greater than the amount of inhibition produced by either substance alone in perchloroethylene. Suitable alkoxyalkylnitriles have a normal boiling point not over about 200° C. and usually in the range of 100° C. to 160° C. They include, for example, β-ethoxypropionitrile, β-methoxypropionitrile, β-isopropoxypropionitrile, β-ethoxyacetonitrile, β-methoxyacetonitrile, β-isopropoxyacetonitrile, etc.

Epoxides suitable for the invention herein described are miscible with halogenated hydrocarbons and generally have a boiling point below 200° C. Most of these oxiranes may be represented by the general formula:

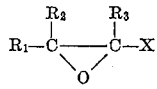

where X is hydroxymethyl, chloromethyl, alkoxymethyl, alkylenoxymethyl, glycidyloxymethyl, alkyl, alkylene, aryl or cycloalkylene when $R_1$, $R_2$ and $R_3$ are hydrogen; X is alkyl when $R_1$ is alkyl and $R_2$ and $R_3$ are hydrogen; X and $R_3$ are hydrogen when $R_1$ and $R_2$ are alkyl; and X and $R_1$ are hydrogen when $R_2$ and $R_3$ are carbon atoms joined in an alkylene bridge. Epoxides generally and those particularly represented by the formula and containing up to about 12 carbon atoms may be used. Those of special value frequently contain 3, 4, 5 or 6 carbon atom skeletons. Among these epoxides of special value are glycidol, epichlorohydrin, diglycid ether, cyclohexene oxide, butadiene monoxide, butene oxides, hexene oxide, styrene oxide and vinylcyclohexene oxide. Some compounds which contain two oxirane configurations likewise have value. These include diepoxyvinylcyclohexene, dicyclopentadiene diepoxide and butadiene diepoxide. Many other epoxides are known which may be used in conjunction with a nitrile to provide enhanced stability in perchloroethylene formulations. However, only those that are not removed from perchloroethylene by simple distillation result in formulations which are commercially attractive for use in dry cleaning fluids. Higher boiling epoxides may be used without departing from the spirit of the invention but these are less attractive for most uses. In general, epoxides boiling above 180° C. are not attractive.

An economic advantage results from the synergistic effect obtained by the joint use of nitrile and epoxide which permits utilization of a reduced quantity of a stabilizing chemical. Thus, an amount of nitrile stabilizer varying from 0.005 percent up to about 0.5 percent by weight of the halogenated hydrocarbon may be employed. Larger amounts, sometimes as much as 2 percent, are also effective, but it is economically advantageous to use the smaller amounts which afford a sufficient degree of protection in the presence of the synergistically cooperating second stabilizer. This second stabilizer may also be employed in an amount varying from 0.005 percent up to about 0.5 percent although uneconomical larger amounts have been found to be effective. When economically desirable, a total quantity of stabilizer as high as 5 percent may be employed.

The stabilizing effect of these stabilizers has been established by a standard test in which strips of metal are exposed to refluxing solvent over a 72 hour period. The corrosive effect of the solvent is intensified by the addition of a small quantity of water. Specifically in the case of perchloroethylene, strips of metal are cut in rectangular shape of about 30 square centimeters. Any suitable test metal may be employed such as 20 gauge galvanized metal for measure of the so-called galvanized metal corrosion. In preparation for the test the strips are cleaned by a 5 minute immersion in a water solution of chromic acid containing 2.5 percent chromic acid by weight at a temperature of 120° F. to 130° F. After the acid dip the strips are rinsed first with water, then with acetone and finally dried. The test apparatus consists of a 300-milliliter flask attached to a small Soxhlet extractor which, in turn, is surmounted by a condenser of the Allihn type. One strip of weighed metal is placed in each of the flask, extractor and condenser. That which is placed in the condenser is so located that condensing solvent will condense on the strip as well as upon the condenser walls. The condenser is attached to a water absorption system for the purpose of absorbing any evolved hydrogen chloride liberated during the test. In the flask of this apparatus one now places 100 milliliters of perchloroethylene or other halogenated solvent and 0.2 milliliter of water. This is now heated to its boiling point employing a carefully controlled electrical heat source to provide a rate of heating such that the extractor empties at 8 to 10 minute intervals. In addition a 100 watt incandescent bulb is located one inch from the vapor line of the extractor to supply energy for photochemical oxidation. When the test period is completed, the water from the absorber is combined with the perchloroethylene in a beaker to which is also added rinsings obtained by washing out the equipment with distilled water. Titration with standard alkali will provide a measure of the amount of acid and consequently the amount of solvent decomposition which has occurred. This, in turn, indicates the effectiveness of the stabilizer which has been placed in the solvent. As a measure of the inhibition of corrosion, it is expedient to weigh the metal strips to determine the weight loss suffered during the test. The change in weight is a direct indication of corrosion sustained by base metals. This same test is employed as a measure of copper corrosion, but in this case, however, the copper strips are cleaned with concentrated hydrochloric acid prior to use and are rinsed with water and acetone exactly as practiced in the case of base metals.

Employing this test, it has been found that reduced corrosion of galvanized metal could be obtained as shown in Table I below.

Table I

| Stabilizer Formulation | Decomposition—Acidity, mls. of 0.01 N NaOH | Galvanized Corrosion—Weight Loss From Test Metal, mg. | | |
|---|---|---|---|---|
| | | Flask | Soxhlet | Condenser |
| Perchloroethylene | >500 | 158 | 199 | 590 |
| Perchloroethylene plus 0.06% by Weight Nitrile [1] | | 315 | 338 | 452 |
| Perchloroethylene plus 0.15% by Weight Nitrile [1] | | 110 | 392 | 282 |
| Perchloroethylene plus 0.10% by Weight Oxide [2] | >25 | 9.3 | 80.8 | 88.4 |
| Perchloroethylene plus 0.25% by Weight Oxide [2] | 14 | 2.5 | 3.2 | 11.2 |
| Perchloroethylene plus 0.06% Nitrile [1] and 0.025% by Weight Oxide [2] | >25 | 15.6 | 49.2 | 45.6 |
| Perchloroethylene plus 0.06% Nitrile [1] and 0.05% by Weight Oxide [2] | >25 | 15.7 | 38.2 | 44.2 |
| Perchloroethylene plus 0.06% Nitrile [1] and 0.15% by Weight Oxide [2] | 19.9 | 3.3 | 4.4 | 2.6 |
| Perchloroethylene plus 0.06% Nitrile [1] and 0.20% by Weight Oxide [2] | 5.4 | 4.3 | 4.5 | 0.0 |

[1] β-Ethoxypropionitrile.
[2] Cyclohexene oxide.

That the corrosion resulting from perchloroethylene containing both nitrile and epoxide is greatly reduced over and beyond that amount resulting from the use of either stabilizer alone is evident on examination of Table I.

In Table II analogous data is presented which shows a like synergistic effect obtained by this stabilizer combination in a test of copper corrosion.

Table II

| Stabilizer Formulation | Decomposition—Acidity, mls. of 0.01 N NaOH | Copper Corrosion—Weight Loss From Test Metal, mg. | | |
|---|---|---|---|---|
| | | Flask | Soxhlet | Condenser |
| Perchloroethylene | 235 | 37.2 | 62.9 | 221 |
| Perchloroethylene plus 0.01% by Weight Nitrile [1] | 18.9 | 2.1 | 13.4 | 60.9 |
| Perchloroethylene plus 0.06% by Weight Nitrile [1] | 1.8 | 1.8 | 5.9 | 9.7 |
| Perchloroethylene plus 0.15% by Weight Nitrile [1] | 5.6 | 2.2 | 7.6 | 17.4 |
| Perchloroethylene plus 0.05% by Weight Oxide [2] | >25 | 12.1 | 19.4 | 228 |
| Perchloroethylene plus 0.10% by Weight Oxide [2] | 5.9 | 1.2 | 10.7 | 27.9 |
| Perchloroethylene plus 0.25% by Weight Oxide [2] | 4.5 | 1.9 | 6.3 | 26.7 |
| Perchloroethylene plus 0.06% Nitrile [1] and 0.01% by Weight Oxide [2] | 2.8 | 1.4 | 6.1 | 10.7 |
| Perchloroethylene plus 0.06% Nitrile [1] and 0.025% by Weight Oxide [2] | 1.5 | 1.9 | 2.5 | 4.4 |
| Perchloroethylene plus 0.06% Nitrile [1] and 0.05% by Weight Oxide [2] | 1.2 | 3.9 | 2.5 | 3.5 |
| Perchloroethylene plus 0.06% Nitrile [1] and 0.15% by Weight Oxide [2] | 1.2 | 0.8 | 5.7 | 4.9 |

[1] β-Ethoxypropionitrile.
[2] Cyclohexene oxide.

As can be seen by examining the data presented in Table II, a degree of inhibition of corrosion of copper metal which is greater than the degree of inhibition produced by either substance alone was obtained. This effect is particularly evident in inhibition of corrosion of copper exposed to hot vapors in the condenser.

Data is presented in Table I and in Table II above which shows the cooperative stabilization of the combination of β-ethoxypropionitrile and cyclohexene oxide in reducing both galvanized metal and copper corrosion according to the tests described supra. Other nitrile-epoxide combinations may also be employed to obtain a like result.

An amount of alkoxyalkylnitrile, notably β-ethoxypropionitrile, corresponding to from 0.005 percent by weight to 2.0 percent by weight of the perchloroethylene content and an amount of epoxide such as epichlorohydrin corresponding to from 0.005 percent by weight to 2.0 percent by weight of the perchloroethylene content is added to the formulation to obtain improved stabilization of the solvent and especially a greatly decreased galvanized metal corrosion by the stabilized solvent. A formulation containing 0.06 weight percent β-ethoxypropionitrile and 0.20 weight percent of epichlorohydrin was prepared and tested as before to result in the data shown in Table III. This result is illustrative of the manner whereby an economical formulation does result in sufficiently reduced galvanized metal corrison to have greater commercial utility.

Table III

| Stabilizer Formulation | Decomposition—Acidity, mls. of 0.01 N NaOH | Galvanized Corrosion—Weight Loss From Test Metal, mg. | | |
|---|---|---|---|---|
| | | Flask | Soxhlet | Condenser |
| Perchloroethylene | >500 | 158 | 199 | 590 |
| Perchloroethylene plus 0.06% by Weight Nitrile [1] and 0.20% by Weight Oxide [2] | >25 | 55.9 | 51.2 | 52.8 |

[1] β-Ethoxypropionitrile.
[2] Epichlorohydrin.

This stabilization afforded perchloroethylene by the presence of alkoxyalkylnitrile in combination with epoxides is not appreciably affected by the presence of many other chemicals. Trichloroethylene, hydrocarbon solvents and other stabilizers do not detract from the synergistic effect noted. Thus, for the inhibition of other types of corrosion such as oxidation for example, phenolic stabilizers such as p-cresol may be added. These third components may be added to the stabilizer solvent after the addition of an epoxide and an alkoxyalkylnitrile or the third component may be added at the same time. Other single stabilizing components such as alcohols, esters, amines, amides, etc., may be added in stabilizing amount. It is obvious to one skilled in the art that many variations of this invention can be made without departing from the spirit thereof. For example, mixtures of nitriles may be substituted for a single nitrile and certain more effective epoxides may be substituted in whole or in part for a less effective epoxide or more expensive epoxide. Likewise, the synergistic effect described herein is of primary interest in the field of perchloroethylene stabilization. However, stabilization may be obtained with equal efficaciousness in other solvents such as trichloroethylene or solvent mixtures.

This application is a continuation-in-part of my application Serial No. 42,995, filed July 15, 1960, now abandoned.

While the invention has been described with reference to certain details of specific embodiments, it is not intended that the invention be construed as limited to such details except insofar as they appear in the following claims.

I claim.

1. A composition of matter comprising perchloroethylene stabilized with a small stabilizing amount of alkoxyalkylnitrile having up to 3 carbon atoms in the alkoxy group and up to 3 carbon atoms in the alkyl group and a small stabilizing amount of an epoxide selected from the group consisting of epoxides containing up to 12 carbon atoms and a carbon atom skeleton containing from 3 to 6 carbon atoms, said epoxide being miscible with said perchloroethylene, having a boiling point below 200° C. and a formula:

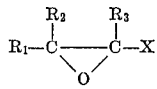

wherein (A) X is a member selected from the group consisting of hydroxymethyl, chloromethyl, alkoxymethyl, alkylenoxymethyl, glycidyloxymethyl, alkyl, alkylene, aryl and cycloalkylene when $R_1$, $R_2$ and $R_3$ are hydrogen; (B) X and $R_1$ are alkyl when $R_2$ and $R_3$ are hydrogen; (C) X and $R_3$ are hydrogen when $R_1$ and $R_2$ are alkyl; and (D) X and $R_1$ are hydrogen when $R_2$ and $R_3$ are carbon atoms joined in an alkylene bridge.

2. The composition of claim 1 wherein the alkoxyalkylnitrile concentration is from 0.005 to 2.0 percent and the epoxide content is from 0.005 to 2.0 percent by weight of the perchloroethylene.

3. A composition of matter comprising perchloroethylene and a small stabilizing amount of β-ethoxypropionitrile and cyclohexene oxide.

4. The composition of claim 3 wherein the β-ethoxypropionitrile content is from 0.005 to 2.0 percent by weight of the perchloroethylene and the cyclohexene oxide content is from 0.005 to 2.0 percent by weight of the perchloroethylene.

5. A composition of matter comprising perchloroethylene and a small stabilizing amount of β-ethoxypropionitrile and epichlorohydrin.

6. The composition of claim 5 wherein β-ethoxypropionitrile and epichlorohydrin are each present in an amount of from 0.005 to 2.0 percent by weight of the perchloroethylene.

References Cited in the file of this patent

UNITED STATES PATENTS

| | | |
|---|---|---|
| 2,364,588 | Morris et al. | Dec. 5, 1944 |
| 2,371,645 | Aitcheson | Mar. 20, 1945 |
| 2,737,532 | Strain | Mar. 6, 1956 |